(12) United States Patent
Summers et al.

(10) Patent No.: US 6,226,348 B1
(45) Date of Patent: May 1, 2001

(54) X-RAY DIFFRACTOMETER METHOD FOR DETERMINING THICKNESS OF MULTIPLE NON-METALLIC CRYSTALLINE LAYERS AND FOURIER TRANSFORM METHOD

(75) Inventors: James Alexander Summers, Waterloo; Christopher John Lawrence Moore, St. Jacob's, both of (CA)

(73) Assignee: Philips Electronics North America Corporation, New York, NY (US)

( * ) Notice: Subject to any disclaimer, the term of this patent is extended or adjusted under 35 U.S.C. 154(b) by 0 days.

(21) Appl. No.: 09/211,921

(22) Filed: Dec. 15, 1998

(51) Int. Cl.[7] .................................................. G01N 23/20
(52) U.S. Cl. .............................................. 378/70; 378/89
(58) Field of Search ............................... 378/50, 54, 56, 378/70, 86, 89; 702/76, 77, 170, 172, 197, FOR 108, FOR 148, FOR 164, FOR 170

(56) References Cited

U.S. PATENT DOCUMENTS 3,854,042 * 12/1974 Ott ............................................. 378/89
5,003,569   3/1991  Okada et al. ............................ 378/70
5,440,661   8/1995  Papcun .
5,457,727  10/1995  Frijlink .................................... 378/73
5,530,732   6/1996  Masayoshi .............................. 378/73
5,740,226   4/1998  Komiya et al. .......................... 378/70

FOREIGN PATENT DOCUMENTS

| 0603943A1 | 6/1994 | (EP) | ............... | G01N/23/20 |
| 2151748   | 6/1990 | (JP) | ............... | G01N/23/20 |
| 2184747   | 7/1990 | (JP) | ............... | G01N/23/20 |
| 09014946A | 1/1997 | (JP) | ............... | G01B/15/02 |

* cited by examiner

*Primary Examiner*—David P. Porta

(57) ABSTRACT

An x-ray diffractometry technique finds thickness of multiple layers of non-metallic crystalline material. A rocking curve is windowed to eliminate a main peak. The windowed curve is smoothed. The smoothed curve is subtracted from the windowed curve to yield a difference curve. The difference curve is transformed to make its average value zero and to constrain its endpoints to zero. A Fast Fourier transform is applied to the transformed difference curve. A thickness transform is applied to the result to yield a layer thickness.

8 Claims, 7 Drawing Sheets

US 6,226,348 B1

X-RAY DIFFRACTOMETER METHOD FOR DETERMINING THICKNESS OF MULTIPLE NON-METALLIC CRYSTALLINE LAYERS AND FOURIER TRANSFORM METHOD

BACKGROUND OF THE INVENTION

A. Field of the Invention

The invention relates to the field of measuring thickness of materials. The invention relates further to a technique for processing signal data so that a Fourier transform can be performed more successfully.

B. Related Art

Measuring thickness of layers is of particular usefulness in the semiconductor arts.

In the past, people attempted to use rocking curve outputs of x-ray diffractometers to measure thickness of layers. This was a cumbersome process. First, the user would identify bumps in a rocking curve manually and manually put cursors at adjacent maxima. From the position of the cursors, an angle of difference could be derived. From that one could derive a dominant thickness in the material under observation. What layer was dominant at a particular angle would depend on Bragg angle and selection rules. The user would have to guess based on expectations of thickness of particular layers in the material. That guess would be a starting point of simulation. The simulation parameters would then be altered until they produced a simulation curve matching the measured rocking curve.

Some also tried to Fourier transform the rocking curve to yield a thickness curve, but the results were so noisy as to be useless.

SUMMARY OF THE INVENTION

The object of the invention is to use an x-ray diffractometer to determine the thickness of multiple non-metallic crystalline layers without manual intervention. Another object of the invention is to improve techniques of taking Fourier transforms.

The inventors recognized that the reason that the Fourier transform did not work on the rocking curve was that the average value of the curve was far from zero.

Accordingly, the inventors developed a technique for deriving a result curve from the rocking curve such that the result curve would have an average value near zero. This led to an automated method for determining thickness of multiple layers using an x-ray diffractometer.

BRIEF DESCRIPTION OF THE DRAWING

The invention will now be described by way of non-limiting example with reference to the following figures.

DETAILED DESCRIPTION OF THE PREFERRED EMBODIMENTS

Figure 1:
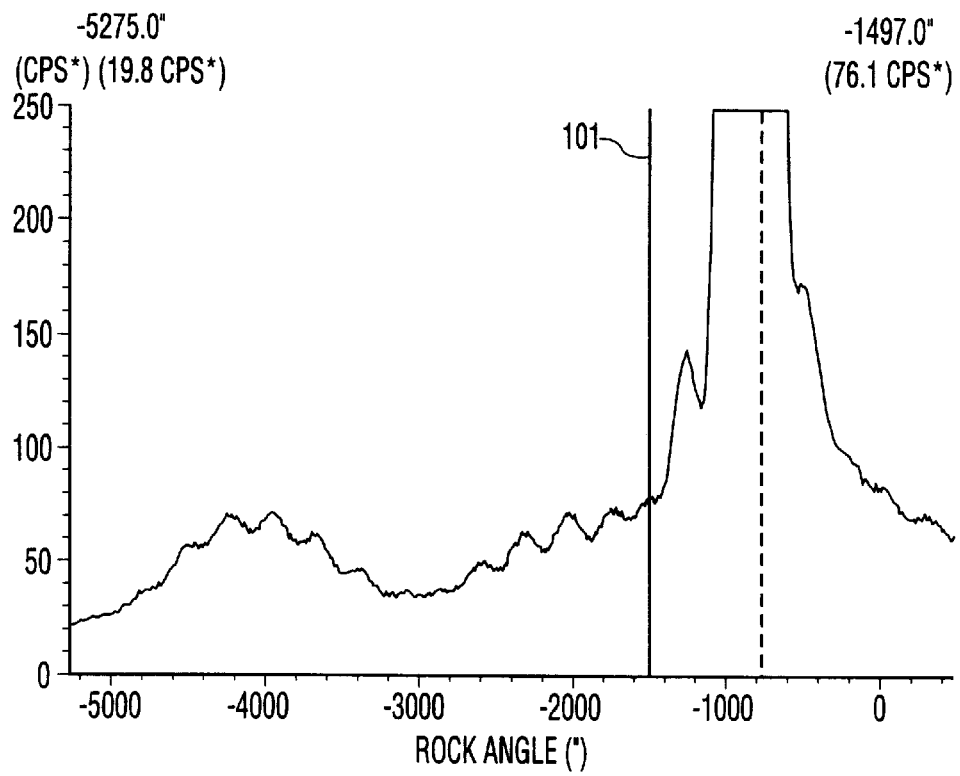
FIG. 1 shows a rocking curve coming from an x-ray diffractometer measurement of a material composed of multiple non-metallic crystalline layers.

FIG. 1 shows a rocking curve of GaAs HEMT (High Electron Mobility Transistor). The horizontal axis of the curve is scaled in units of arc seconds, from −5275.0" to 0. At −5275" the curve reads 19.8 cps*. The vertical axis measures intensity in units of cps* (counts per second) from 0 to 250. The units on the axes of FIGS. 1–3 and 9–11 are all the same. This rocking curve is received per block 1301 of FIG. 13 from an x-ray diffractometer.

The scaling of FIG. 1 has been chosen such that the main peak has been truncated, for clarity. Actual curve scaling is irrelevant. First the main peak, whose average value is VERY far from zero, is removed from the rocking curve using a window shown by line 101 in FIG. 1 per step 1302 of FIG. 13. Line 101 is at −1497.0" and the curve there has a value of 76.1 cps*. In the first instance, the peak must be windowed manually. However, once the window is set, the window placement in relation to the main peak can be used for all other samples of the same expected composition, so that windowing can be automated. Variations in the position of the peak can be automatically compensated for by an automated search of the points of the rocking curve to find the maximum intensity value.

Figure 2:
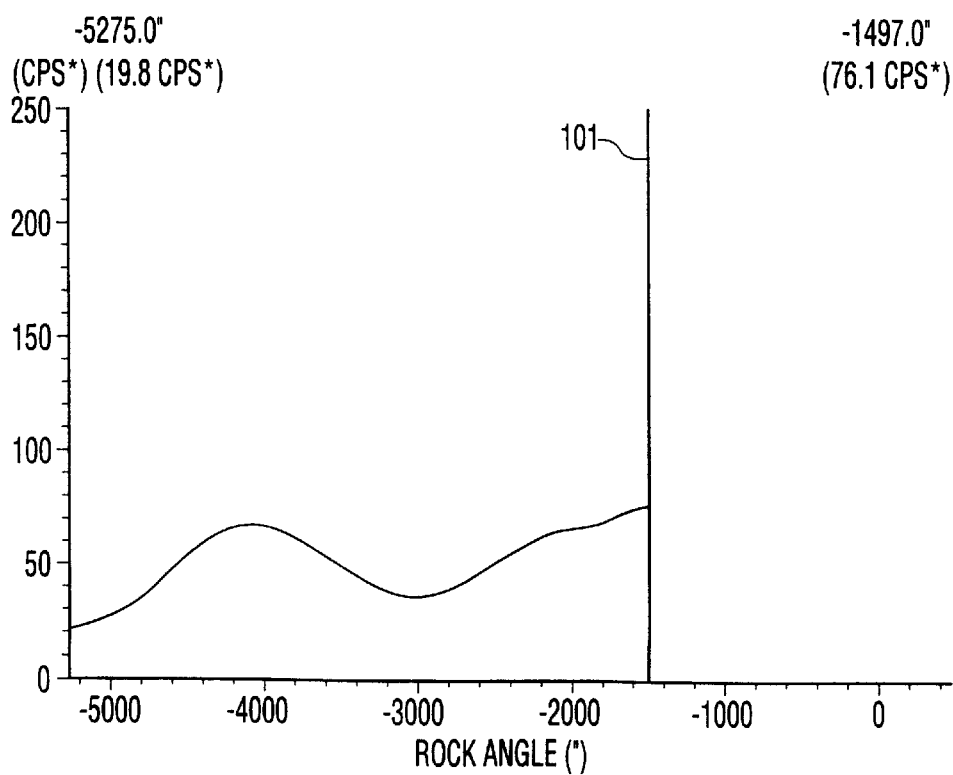
FIG. 2 shows a smoothed version of a portion of the curve of FIG. 1.
Figure 13:
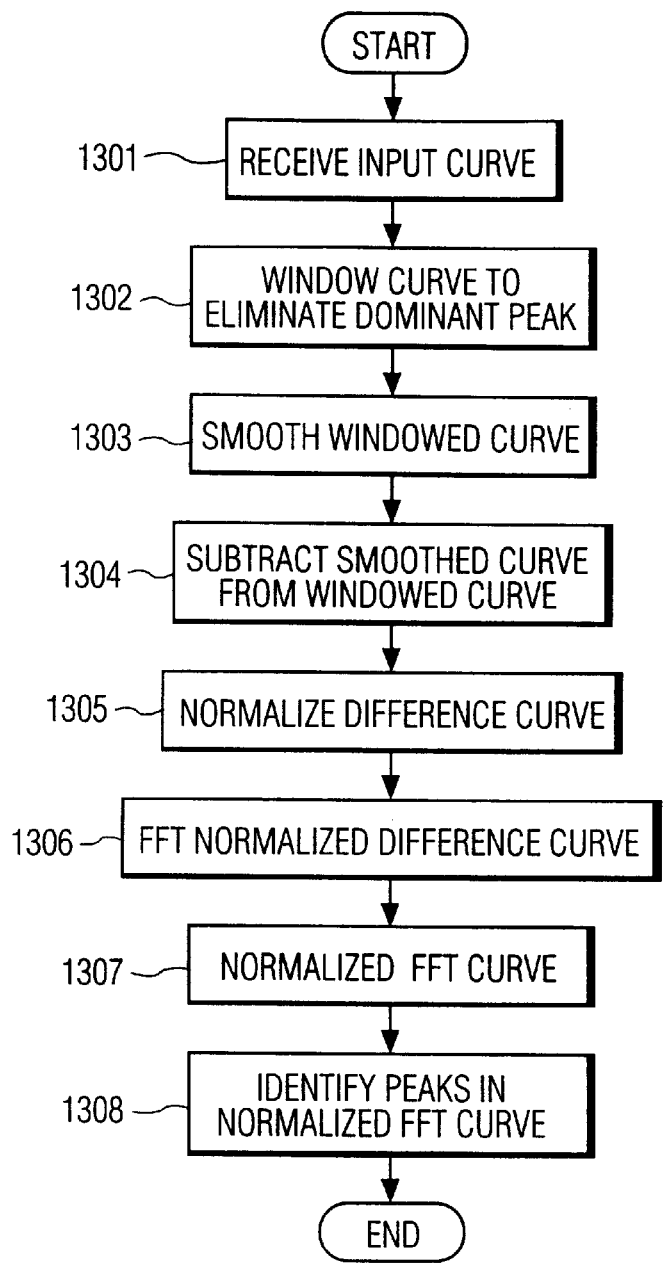
FIG. 13 shows a flowchart.

The windowed curve is then smoothed to yield the smoothed curve shown in FIG. 2 per block 1303 of FIG. 13. Those of ordinary skill in the art might devise any number of smoothing functions. For instance, a running average might be used. The rocking curve actually consists of a series of experimental points. In smoothing, the value of a point might be replaced by the average value of that point taken with the two adjacent points on either side.

Figure 3:
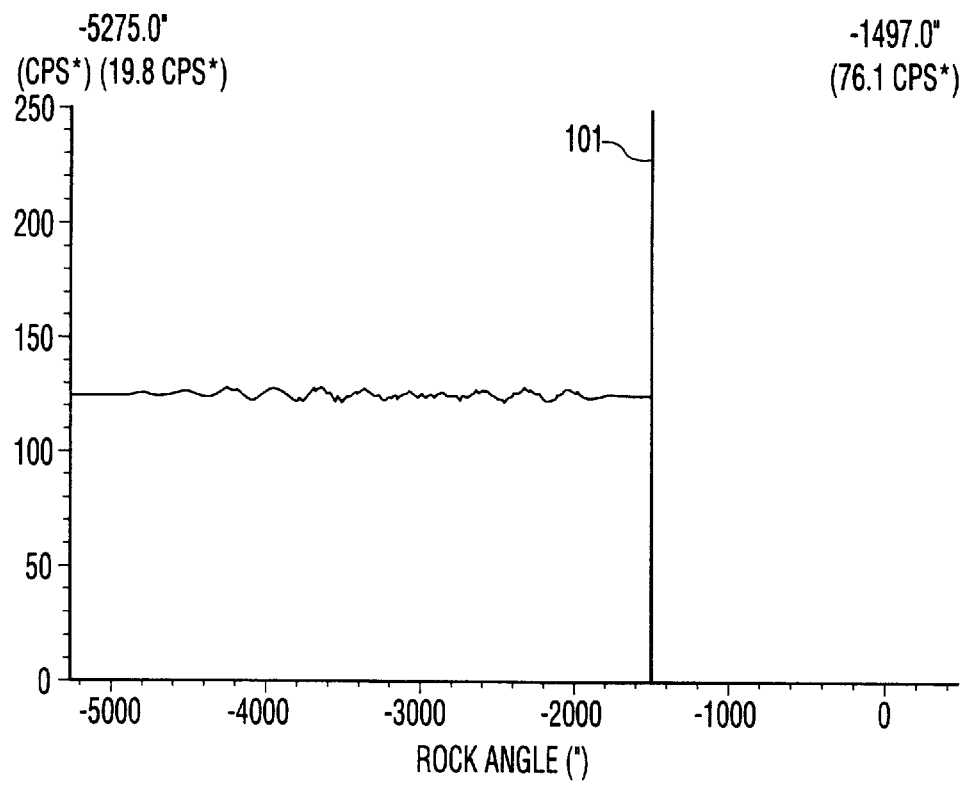
FIG. 3 shows a difference curve resulting from subtracting the curve of FIG. 2 from a portion of FIG. 1.

The smoothed curve is then subtracted from the windowed curve to yield the difference curve shown at FIG. 3 per block 1304 of FIG. 13. A transform or normalization is then applied to the difference curve per block 1305. This transform is such as to make the difference curve have an approximate average value near zero, with both end values forced to zero. Preferably a Welch Window is used to normalize the data.

A Fast Fourier Transform of the transformed difference curve is made using angle as the transform variable per block 1306 of FIG. 13. The normalized curve data typically includes about 100 data values. This data is copied into the first elements of a large buffer, typically with 2048 points, with remaining data values set to 0. The FFT (Fast Fourier Transform) algorithm transforms this buffer into a power spectrum which is the curve shown in FIG. 4. The actual magnitude of the points in the power spectrum are not important, because only the position in the curve is needed to compute a thickness not a height. Therefore, for convenience, the power spectrum magnitudes are normalized so that the maximum data value in the curve is set to 100% and all the other values are scaled to their fraction of the maximum value. Thus, in the curve of FIG. 4, the horizontal axis is marked in units of thickness in Angstroms (Å) and the vertical axis is marked in normalized percentage.

Clear peaks are found at 93 Å (A), 683 Å (B), and 700 Å (C). The position of a peak in the power spectrum is determined by finding a local maximum, the position of which is an index (I) into the buffer. This index is converted to a thickness value $$t = i * \frac{W}{2*N*\cos(B)} * \frac{3600*180}{s*\pi}$$

(t) using the following equation:
Where
W is the wavelength of the X-rays used to take the data in Angstroms;
N is the number of points in the FFT
B is the Bragg angle of the material
S is the interval between samples in the rocking curve, in arcseconds $$\frac{W}{2*N*\cos(B)} * \frac{3600*180}{s*\pi}$$

is the thickness constant.

Because t is simply a constant multiple of I, the X-axis of the power spectrum is labeled by multiplying the index positions of the points by the thickness constant.

Figure 5:
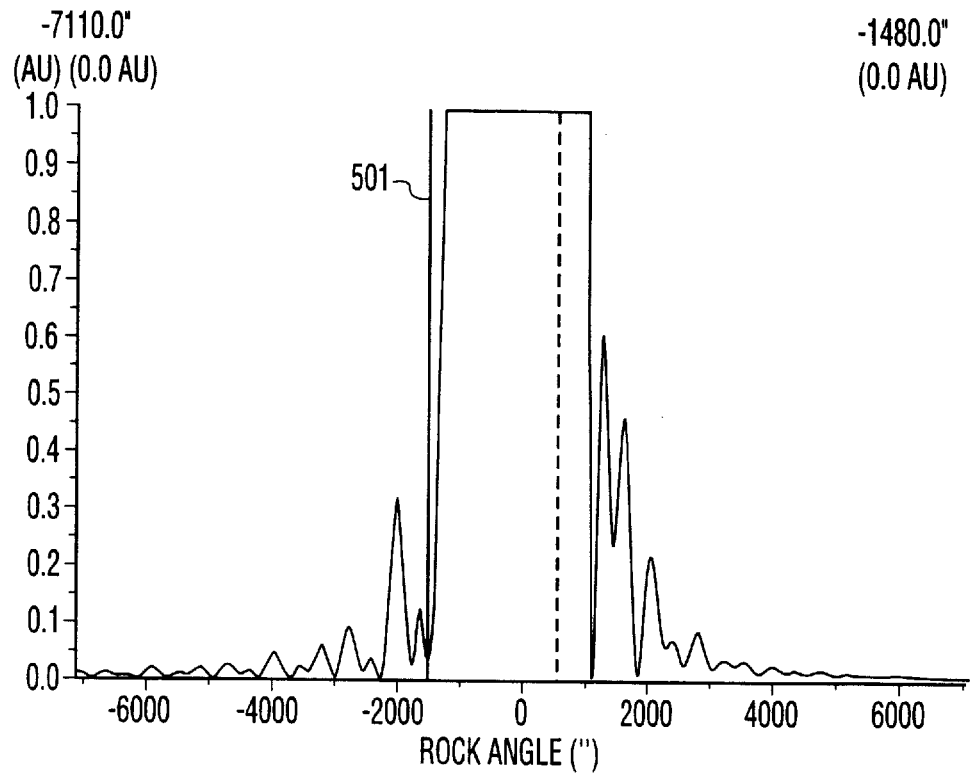
FIG. 5 shows a second rocking curve.

FIG. 5 shows a rocking curve for a Silicon Germanium thin film structure. FIG. 5 starts at −7110.0 arc seconds with a value of approximately zero AU, where "AU" means arbitrary units. The units are not significant because the values will be normalized later. FIG. 5 has more than one main peak, i.e. more than one peak whose average value is far from zero. Accordingly, a windowing function 501 is used to remove all main peaks, i.e. all peaks with high rates of change. The window 501 is placed at −1480" where the rocking curve value is 0.05 AU, which is rounded to 0.0 for display of the label.

Figure 4:
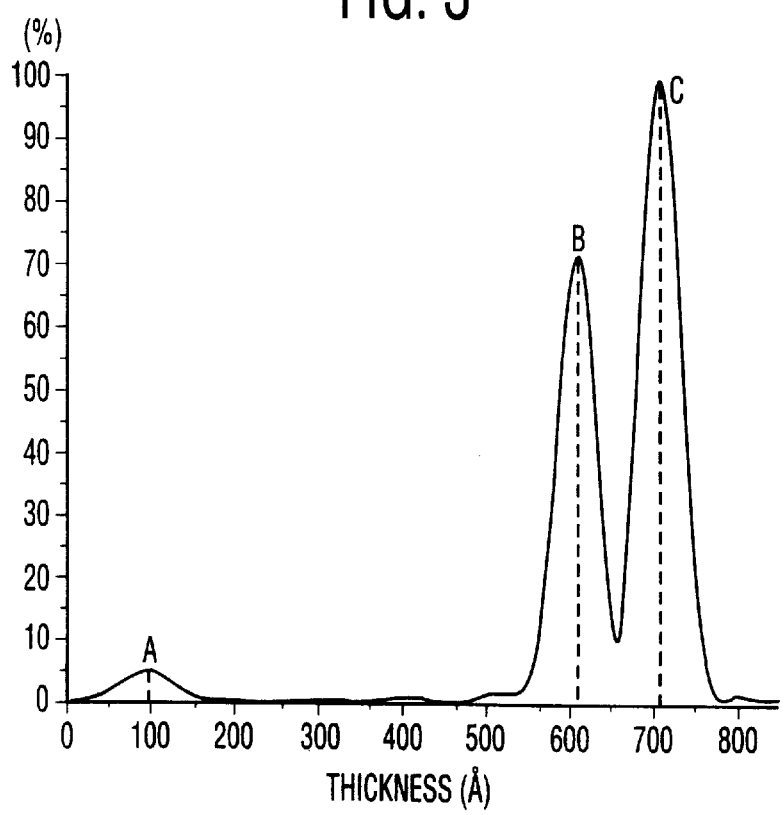
FIG. 4 shows a Fourier transform curve of the curve from FIG. 3.
Figure 6:
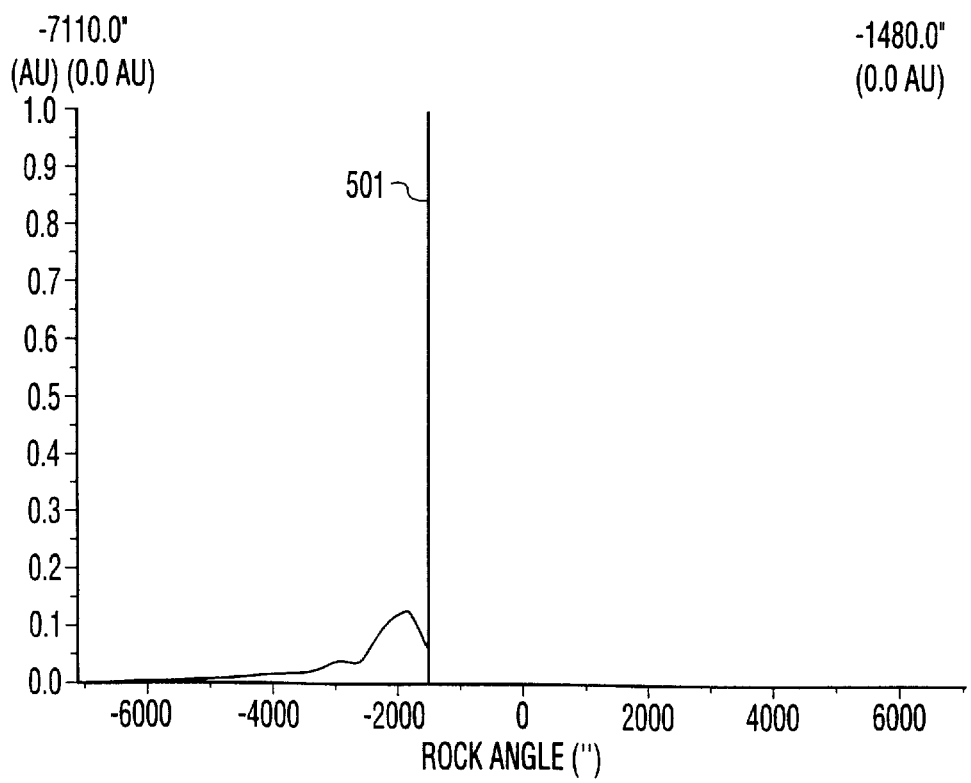
FIG. 6 shows a smoothed version of FIG. 5.
Figure 7:
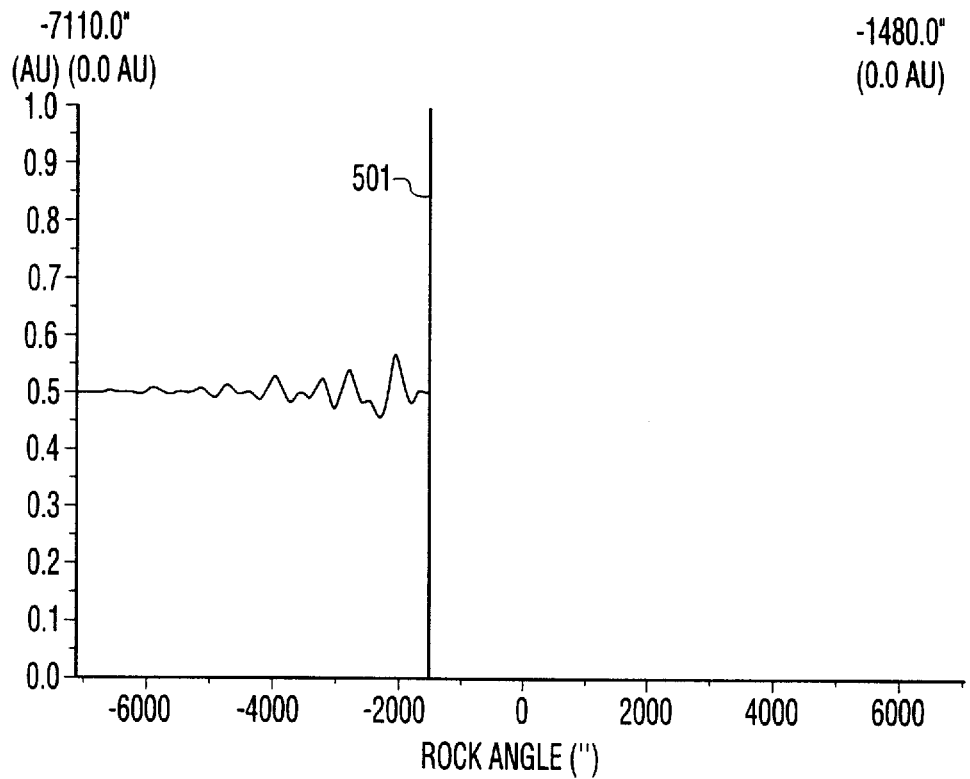
FIG. 7 shows a difference curve resulting form subtracting the curve of FIG. 6 from a portion of FIG. 5.
Figure 8:
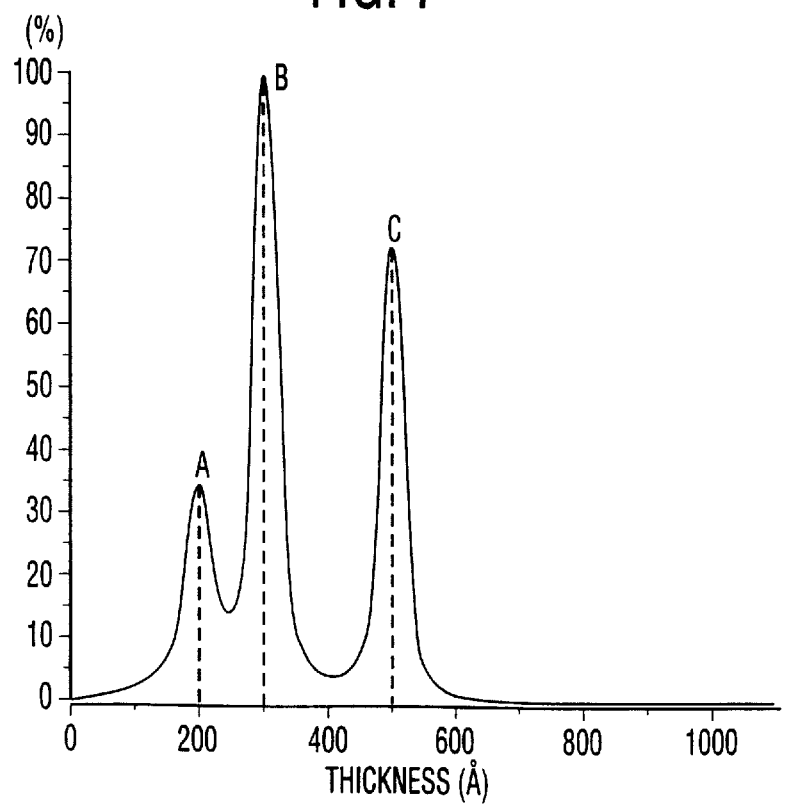
FIG. 8 shows a Fourier transform of FIG. 7.

The windowed curve is then smoothed to yield the smoothed curve of FIG. 6. The smoothed curve is then subtracted from the windowed curve to yield the difference curve of FIG. 7. The difference curve is then transformed to make its average value zero and to constrain its end values to zero. The resulting curve is then Fast Fourier transformed using angle as the transform value, then transformed as described above, to yield the transform curve of FIG. 8. Like FIG. 4, FIG. 8 is in units of Å on the horizontal axis and normalized percentage on the vertical axis. The peak values are then automatically determined according to a peak finding algorithm. The thickness values established according to FIGS. 4 and 8 were cross-checked experimentally by the simulation parameter technique described in the background section of this application and found to be accurate to within a range of 1% to 3.5%.

Figure 9:
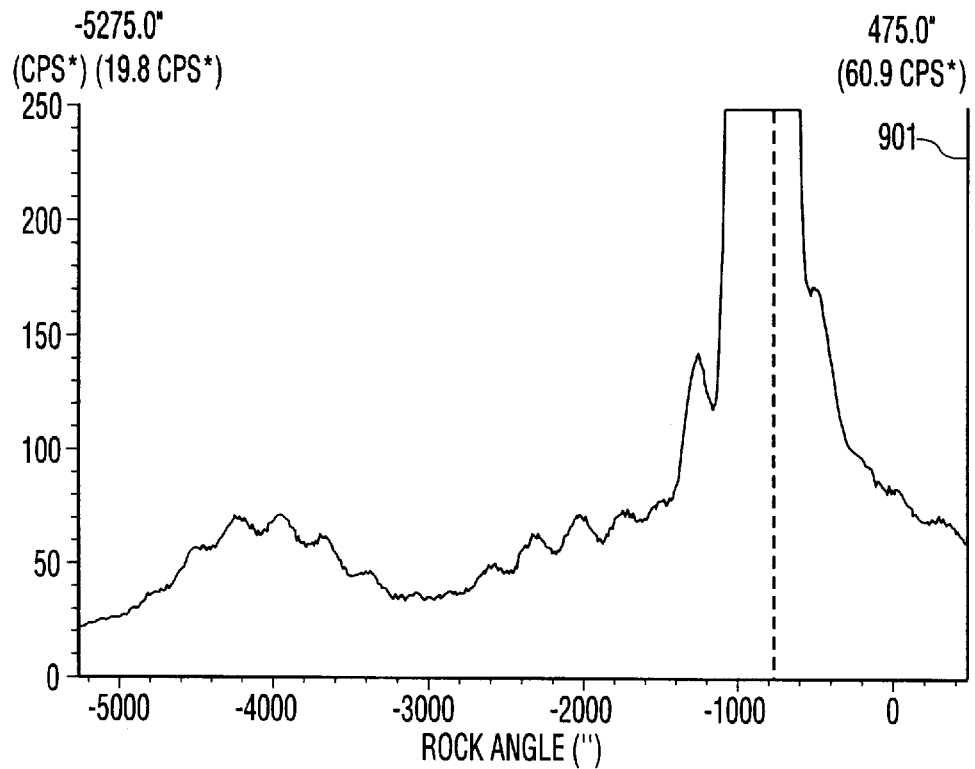
FIG. 9 shows a rocking curve which is incorrectly windowed.
Figure 10:
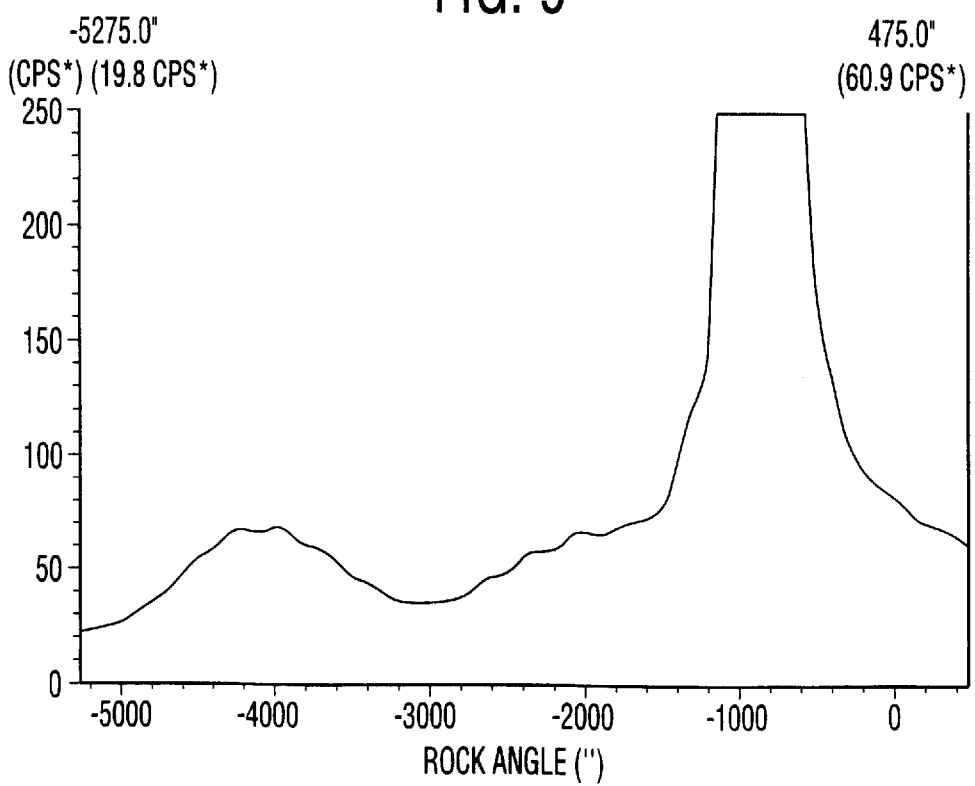
FIG. 10 shows a smoothed version of FIG. 9 within the incorrect window.
Figure 11:
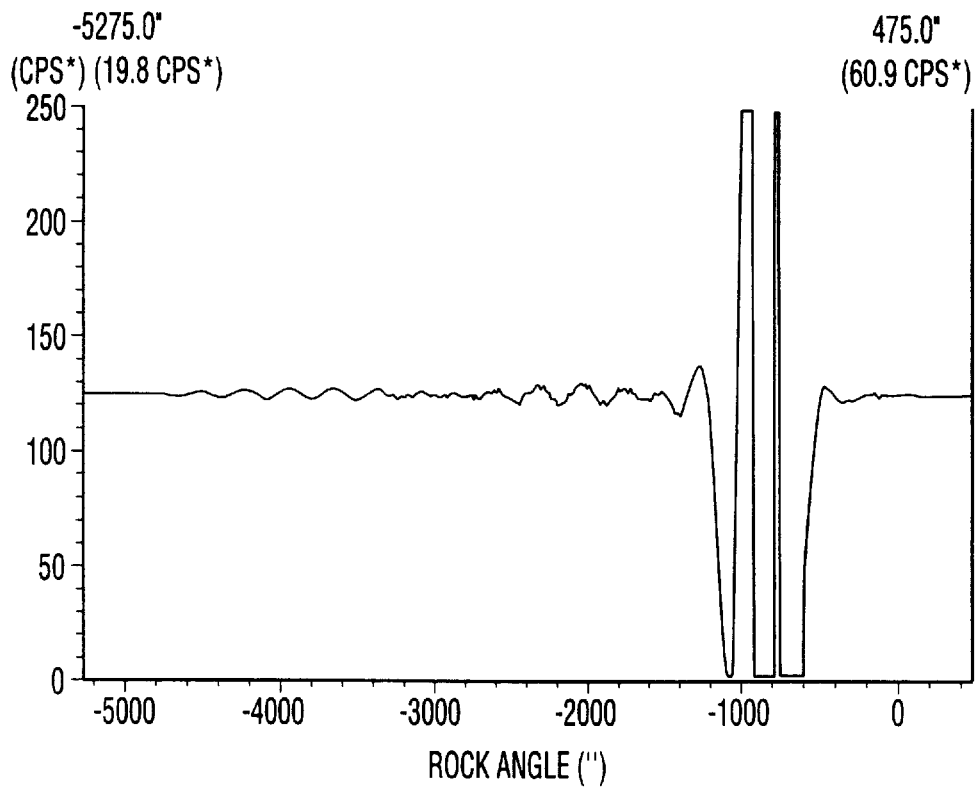
FIG. 11 shows the difference curve between FIGS. 9 and 10.
Figure 12:
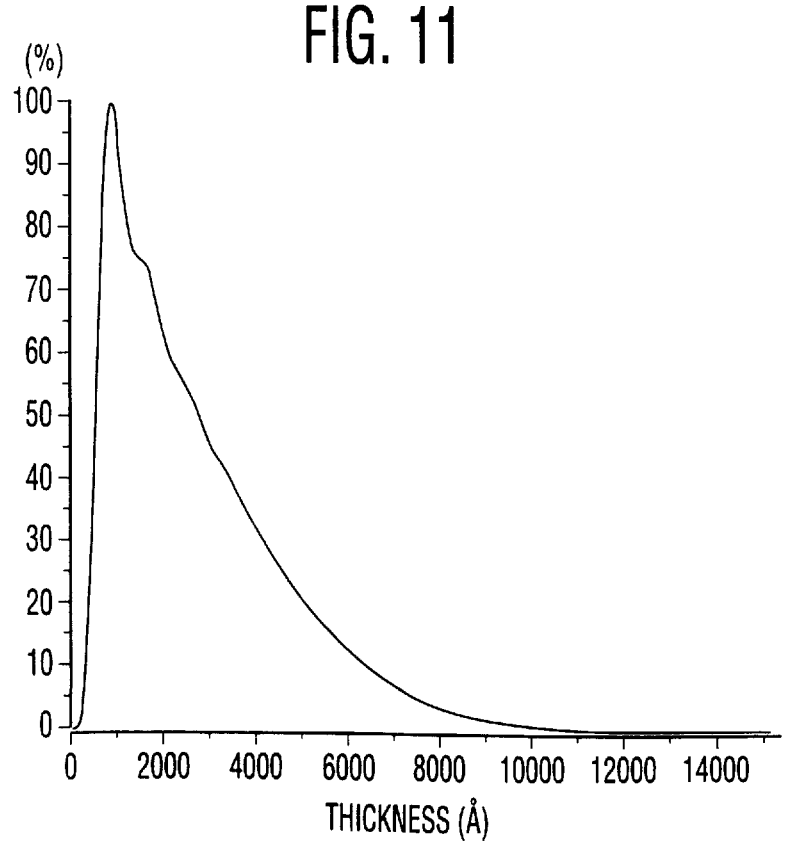
FIG. 12 shows the Fourier transform of FIG. 11.

FIGS. 9–12 show the results of improper window placement at the outset. FIG. 9 shows windowing the curve of FIG. 1 incorrectly at 901. FIG. 10 shows the resulting smoothed function. FIG. 11 shows the difference curve between FIGS. 9 and 10. This curve is then transformed and Fast Fourier transformed as described above to yield FIG. 12. A comparison of FIG. 12 and FIG. 4 shows that the incorrect placement of the initial window has rendered FIG. 12 unusable with a single peak at an inappropriate thickness value.

As stated before, the initial window function must be chosen first empirically by a user to eliminate main peaks. However, once the window position is known, all future thickness measurements on the same type of sample can be performed automatically.

FIG. 13 shows a flow chart of the operation of the signal processing apparatus of invention as applied in an automated context. The reference numerals of this flow chart have been inserted in appropriate places in the text above to show the steps of the operation.

Figure 14:
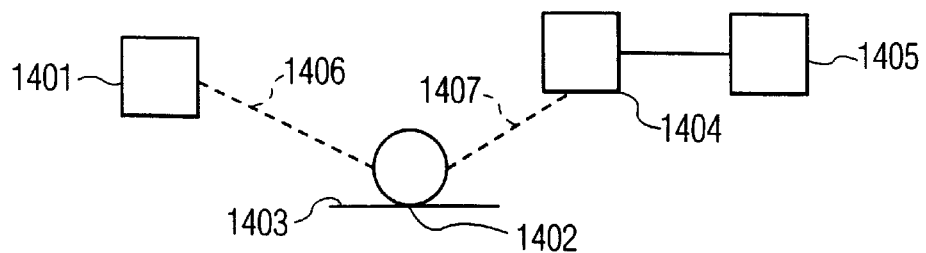
FIG. 14 is a schematic of an x-ray diffractometer.

FIG. 14 shows an x-ray diffractometer. The diffractometer includes a source 1401, a sample holder 1403, a detector 1404, and a processor 1405. X-rays 1406, from the source 1401, incident on the sample 1402, produce diffraction radiation 1407 which is detected at detector 1404. Motion of the source, sample, or detector, can yield the so-called rocking curve, which is then provided to the processor 1405. The processor 1405 then performs the operations of FIG. 13.

We claim:

1. An x-ray system comprising:
   an x-ray source arranged to irradiate a sample;
   a detector capable of detecting a diffracted signal from the irradiated sample; and
   a processor arranged to receive an output signal from the detector, receive predetermined empirical parameters, generate a thickness curve from the empirical parameters and the output signal, and interpret the thickness curve to yield thickness values,
   wherein the empirical parameters comprise a window function for windowing a main peak of the output signal.

2. An x-ray system according to claim 1, wherein the processor automatically calculates, respective thicknesses of multiple layers of the sample.

3. The system of claim 2, wherein the sample is a non-metallic, crystalline material.

4. The system of claim 1 wherein
   the output signal gives an intensity as a function of an angle of either the source or the detector;
   the generating step comprises
      windowing the output signal based on the empirical parameters to eliminate at least one peak, which is relatively larger than other peaks in the curve, to yield a windowed curve;
      applying a smoothing function to the windowed curve to yield a smoothed, windowed curve;
      subtracting the smoothed, windowed curve from the windowed curve to yield a difference curve having an average value near zero;
      Fourier transforming the difference curve to yield the thickness curve;
   the interpreting operation comprises associating thickness values with peaks in the thickness curve.

5. The system of claim 4 wherein the processor is arranged to perform the following additional operations:
   after the subtracting step, norming the difference curve to yield a normed difference curve having an average value near zero and end values near zero, the Fourier transforming operation then being performed on the normed difference curve; and
   after the Fourier transform operation, thickness transforming a result of the Fourier transform to yield the thickness curve.

6. The system of claim 3 wherein the interpreting operation comprises windowing the thickness curve by applying thickness windows at expected thickness values and taking peak values within thickness windows.

7. The system of claim 2, wherein the sample is a metallic material.

8. An x-ray system comprising:

an x-ray source arranged to irradiate a sample;

a detector capable of detecting diffracted signal from the sample;

a processor coupled with the detector, the processor being arranged to automatically calculate a respective thickness of at least one layer of a non-metallic, crystalline material, wherein the processor is arranged to perform the following operations:

receiving data from the detector;

receiving predetermined empirical parameters comprising a window function for windowing a main peak of the data;

generating a thickness curve from the empirical parameters and the data; and interpreting the thickness curve to yield thickness values.

* * * * *